United States Patent [19]

Bernhardt et al.

[11] Patent Number: 5,594,668
[45] Date of Patent: Jan. 14, 1997

[54] METHOD FOR CORRECTING COORDINATE MEASUREMENT ON WORKPIECES BASED ON BENDING CHARACTERISTICS

[75] Inventors: Ralf Bernhardt, Aalen; Günter Grupp, Böhmenkirch, both of Germany

[73] Assignee: Carl-Zeiss-Stiftung, Brenz, Germany

[21] Appl. No.: 454,461

[22] Filed: May 30, 1995

[30] Foreign Application Priority Data

Oct. 13, 1994 [DE] Germany .......................... 44 36 507.1

[51] Int. Cl.⁶ .................................................. G06F 15/46
[52] U.S. Cl. .............. 364/571.07; 364/560; 364/474.35; 33/504
[58] Field of Search ............................ 364/560, 571.01, 364/571.02, 571.04, 571.05, 571.07, 474.03, 474.16, 474.18, 474.3, 474.31, 474.35, 474.37; 33/503, 504, 556

[56] References Cited

U.S. PATENT DOCUMENTS

| | | | |
|---|---|---|---|
| 4,333,238 | 6/1982 | McMurtry | 33/553 |
| 4,796,195 | 1/1989 | Haggerty | 364/474.35 |
| 4,819,195 | 4/1989 | Bell et al. | 364/571.05 |
| 5,138,563 | 8/1992 | Debitsch et al. | 364/560 |
| 5,152,072 | 10/1992 | McMurty et al. | 33/558 |
| 5,189,806 | 3/1993 | McMurtry et al. | 33/503 |
| 5,471,406 | 11/1995 | Breyer et al. | 364/474.29 |

*Primary Examiner*—Emanuel T. Voeltz
*Assistant Examiner*—Kyle J. Choi

[57] ABSTRACT

Measured position data (Px, Py, Pz) are combined with stored correction values (DB) describing the elastic bending behavior of a coordinate measuring machine in that parameters characterizing the bending behavior are determined for several positions of the probe of the machine within the measuring range (30) of the machine, the acceleration-dependent components of these parameters are determined and stored in the form of correction values (c11, c22) which describe the bending behavior of the coordinate measuring machine as a function of the position (Px, Py, Pz) of measuring slides (22, 23, 24), and at least of the acceleration (ax, ay, az) of the measuring slides introduced via the drives, the correction values being combined with measured position data (Px, Py, Pz) of the coordinate measuring machine in subsequent coordinate measurements on workpieces.

17 Claims, 6 Drawing Sheets

METHOD FOR CORRECTING COORDINATE MEASUREMENT ON WORKPIECES BASED ON BENDING CHARACTERISTICS

BACKGROUND OF THE INVENTION

1. Field of the Invention

The invention relates to a method for coordinate measurement on workpieces using a coordinate measuring machine (CMM) in which the measured data are corrected by means of stored correction values.

2. Relevant Prior Art

To increase the measuring accuracy of CMMs, the measured data, i.e. the coordinate values supplied by the measuring scales in the machines axes have been mathematically corrected for some time now. Normally, corrections are made as a result of the static guideway deviations of the CMM measuring slides from a straight and orthogonal coordinate system, these deviations being derived according to the so-called "rigid model". Such correction methods are described, for example in the paper "Numerical Error Correction of a Coordinate Measuring Machine" by K. Busch, H. Kunzmann and F. Wäldele in the Proceedings of the International Symposium on Metrology for Quality Control in Production, Tokyo 1984, pp. 284–288, and in U.S. Pat. No. 4,819,195.

For tactile coordinate measuring machines, it is also a known method to determine the amount of probe bending during contact with the workpiece being measured and to take this amount into account in the subsequent data evaluation. Such a method is described, for example, in the paper "Korrektur der Taststiftbiegung bei Messung mit Mehrkoordinaten-Messgeräten" (Correction of Probe Bending When Measuring with Coordinate Measuring Machines) by A. Weckenmann, G. Goch and H. D. Springborn, in Feinwerktechnik und Messtechnik 87 (1979) 1, pp. 5–9 and in the paper "Messende Taster mit mehreren Freiheitsgraden" (Measuring Probes with Several Degrees of Freedom) by W. Lotze in Technische Rundschau, issue 50 (1992) pp. 20–25.

In this method, the bending tensor of the respective probe is defined by probing a calibration sphere several times using different measuring forces. From this, the correction values for the different probes used for measuring a workpiece are calculated and stored, and included in the data evaluation of measurements of unknown workpieces.

Furthermore, it is a known method to correct the dynamic deviations of the measuring slideway of a CMM, i.e., the errors which occur due to the fact that the CMM's probe head mounted on the end of the horizontal arm is not at rest, but vibrates about its rest position as a result of error influences such as drive acceleration, for example. Such a correction method is described, for example, in U.S. Pat. No. 4,333,238. Such dynamic correction methods use sensors which are mounted in the vicinity of the vibrating probe head and which generate signals representing the course of the spurious oscillation at the moment the probing contact is made.

However, the described known methods all correct only a part of the errors which are likely to occur when measuring with a CMM. The measuring uncertainty of CMMs can be reduced with these methods, but considerable residual errors still remain which limit the measuring accuracy of the CMM.

In German Patent Application P 44 18 550.2, corresponding to a U.S. patent application Ser. No. 08/452,803, which is filed contemporaneous herewith, and which is incorporated herein by reference, a method is described which takes into account for the first time flexibility and elastic behavior of the structure and the measuring slides of the CMM, that is, their flexibility due to the forces applied during probing by the workpiece on the CMM probe head. Although these forces are relatively low and although the distortion of the structure of the machine caused by them is only low, they may still appear as measuring errors if the specified measuring uncertainty of the CMM is in the submicron range. This distortion depends on the extension of the CMM measuring slide and therefore causes deviations of the measured coordinate data of different magnitude as a function of the position of the probe head within the CMM measuring range.

However, the probing force is only one of several forces acting on the coordinate measuring machine during the probing process. Other forces are caused by bearing stress due to acceleration of the measuring slides and inertia of masses in the moving parts, which also lead to distortion of the CMM structure and thus to measuring errors.

SUMMARY OF THE INVENTION

It is therefore the object of the present invention to develop a method for correcting measuring errors in a CMM introduced by the influence of the reaction forces caused by inertia of masses of moving parts in a CMM.

This object is achieved in a CMM having at least one measuring slide, a certain measuring range and a probe head with a probe fixed to the measuring slide, by the steps of establishing parameters characterizing an elastic bending behavior of the CMM for several probe positions within the measuring range by determining components of the parameters, the components being dependent on the position of the measuring slides, and being at least dependent on acceleration forces acting on the slides, storing the components as correction values and performing correction calculations by taking into account the stored correction values in subsequent coordinate measurements on workpieces.

Using the correction method according to the invention, the elastic bending behavior of the CMM caused by bearing stress of accelerated masses is determined for several positions of the probe within the measuring range of the CMM. From the data measured as bending behavior, the correction values are calculated, stored and taken into account in the subsequent measurement of unknown workpieces in the coordinate data of the probing points supplied, for example, by the measuring scales of the CMM. In this manner, it is not only possible to reduce the measuring uncertainty of existing CMMs, this new type of correction also permits CMMs to be built with a lighter structure in the future, as the more pronounced elastic distortions of the machine resulting from this lightweight construction can be mathematically compensated for.

It is advisable to compile and store the correction data characterizing the bending behavior in the form of a multi-dimensional correction table, with the possibility of interpolating between the stored correction data in the actual correction of the workpiece data. This interpolation also permits the number of correction values of the table to be kept to a minimum.

It is also possible, however, to approximate the positional dependence of the correction data characterizing the bending behavior using mathematical functions such as polynomials, for example. In this case, it is only necessary to store the coefficients of these approximation functions.

In the present invention, the stored tables or functions are a function of the parameter "acceleration" and the actual correction takes place in that the acceleration of the machine slides through the drives is permanently measured or determined during the coordinate measuring process, and is then included in the correction calculation by multiplying the value measured for the acceleration with the stored correction values describing the bending behavior.

Particularly high bearing stress, e.g. accelerations, occur if curved surfaces such as circular or annular geometric elements are scanned at high speed on a workpiece. A fast scanning procedure which can be used to solve such measuring tasks is described, for example, in German Laid Open Specification DE-OS 42 12 455. It is possible by adopting this known method, to perform an advance determination of the correction values to be stored, by scanning a test specimen in the form of a ring gage successively in different positions in the CMM measuring range and scanning it at varying velocities. This permits position-dependent determination of the flexibility of the machine structure by measuring a change to the probe tip position as a function of machine acceleration.

However, it is not only the machine slides which are subjected to distortion by the influence of the forces of mass inertia. These also act on the probe which is mounted flexibly in the probe head and remains in contact with the workpiece surface during the scanning process. The forces of mass inertia of the probe increase measuring forces when scanning concave workpieces and decrease measuring forces when scanning convex surfaces. The dynamic distortions which the probe is subjected to in this process, should best also be taken into account in the correction of the measured coordinate data.

Although the acceleration of the CMM measuring slides causing the distortion can be measured by means of separate sensors, it is of great advantage to determine the slide acceleration by differentiating the positional data of the measuring systems assigned to the measuring slides, in other words the scales, twice according to time. The need for additional sensors is then eliminated and the acceleration signal can be obtained with very little electronic hardware from the existing transducers for the slide positions.

It is of particular advantage if the new correction method is used in combination with the known correction method for correcting statistical guideway deviation of the measuring slides according to the "rigid model". The expenses which would otherwise have to be invested in the guideway quality during the construction of the CMM can then be further reduced.

BRIEF DESCRIPTION OF THE DRAWINGS

The invention will now be described with reference to the detailed specification, taken together with the drawings, in which.

DETAILED DESCRIPTION OF PREFERRED EMBODIMENTS

In the following, FIGS. 1–8 are used to explain how the essential elastic distortions, i.e., the machine bending, which occur as a result of forces of mass inertia during the acceleration of the measuring slides, can be corrected in a portal-type CMM. The portal-type coordinate measuring machine illustrated in FIG. 1 comprises a machine table (21), portal (22) moving horizontally on it in the Y-direction, with this portal carrying the so-called cross slide (23) guided in the X-direction on crossbar (22a), and spindle (24) guided vertically in the Z-direction in cross slide (23) with probe head (25) with probe (26) being mounted on this spindle.

Figure 1:
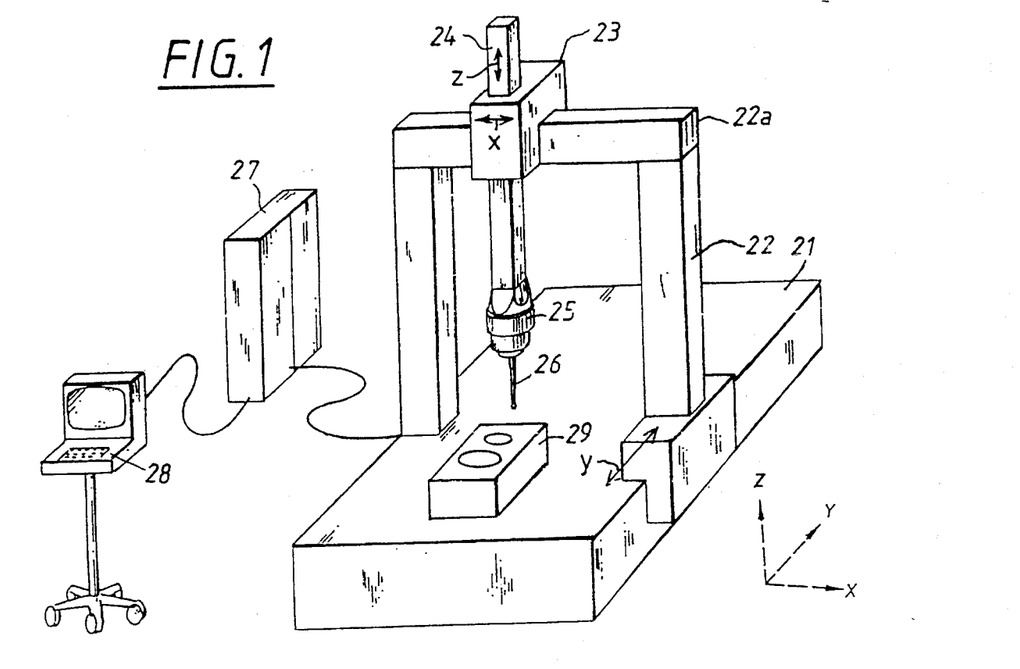
FIG. 1 illustrates the basic design principle of a portal type CMM.

The CMM control is labeled (27) and the computer (28).

When a workpiece (29) is probed, the following elastic distortions primarily occur:

1. When accelerating in the X- and Y-directions, the relatively slim and lightly built spindle (24) bends as a function of its projection in the Z-direction opposite to the acceleration direction. This results in two error components xTx(z,ax) and yTy(z,ay).

2. Also, crossbar (22a) tilts about the bearing of the lateral guideway in portal foot (22). This motion also depends on the leverage, i.e. on the position of cross slide (23) in the X-direction. This produces the error component yty(x,ay).

Compared to these errors, the other elastic deviations of the portal-type CMM are negligible. The three afore-mentioned distortions or error components are explained in the drawings of FIGS. 7 and 8a. It must be said here, that an additional error ΔTk occurs if long or laterally angled probes are used such as probe (26a) in FIG. 8a, for example. This error is a function of the probe coordinate Tk and angle α. about which spindle (24), which is mounted indirectly on crossbar (22a), is twisted out of its force-free position under the influence of machine acceleration.

In general, machine distortions as a function of acceleration can be described by equation:

$$\vec{K} = \vec{P} + C(x,y,z) \cdot \vec{a} \quad (1)$$

$$\begin{vmatrix} Kx \\ Ky \\ Kz \end{vmatrix} = \begin{vmatrix} Px \\ Py \\ Pz \end{vmatrix} + \begin{vmatrix} c11 & c21 & c31 \\ c12 & c22 & c32 \\ c13 & c23 & c33 \end{vmatrix}_{(x,y,z)} \begin{vmatrix} ax \\ ay \\ az \end{vmatrix} \quad (2)$$

where in the vector type of equation (1) $\vec{K}$ is the corrected probe head coordinate, $\vec{P}$ the probe head position measured via the scales, $\vec{a}$ the acceleration and C a tensor which describes the flexibility of the machine structure. This tensor C is a function of the projection length of the measuring slides, in other words of the position of probe head (25) within the measuring volume of the machine.

Based on the previous assumption that only the three error components in question play a role in the coordinate measuring machine shown in FIG. 1, the component type according to equation (2) leads to equations (3) and (4).

$$Ky=Py+c22(x,z)\cdot ay \qquad (3)$$

$$Kx=Px+c11(z)\cdot ax \qquad (4)$$

This results in the actual coordinates Kx and Ky which can be obtained from the positional data Py and Px supplied by the measuring systems of the coordinate measuring machine. This is done by multiplying the tensor elements c22(x,y) and c11 (z), which are a function of the probe head position in the measuring volume, with the measured acceleration components ay and ax and adding the result to the positional data Py and Px respectively.

Figure 5:
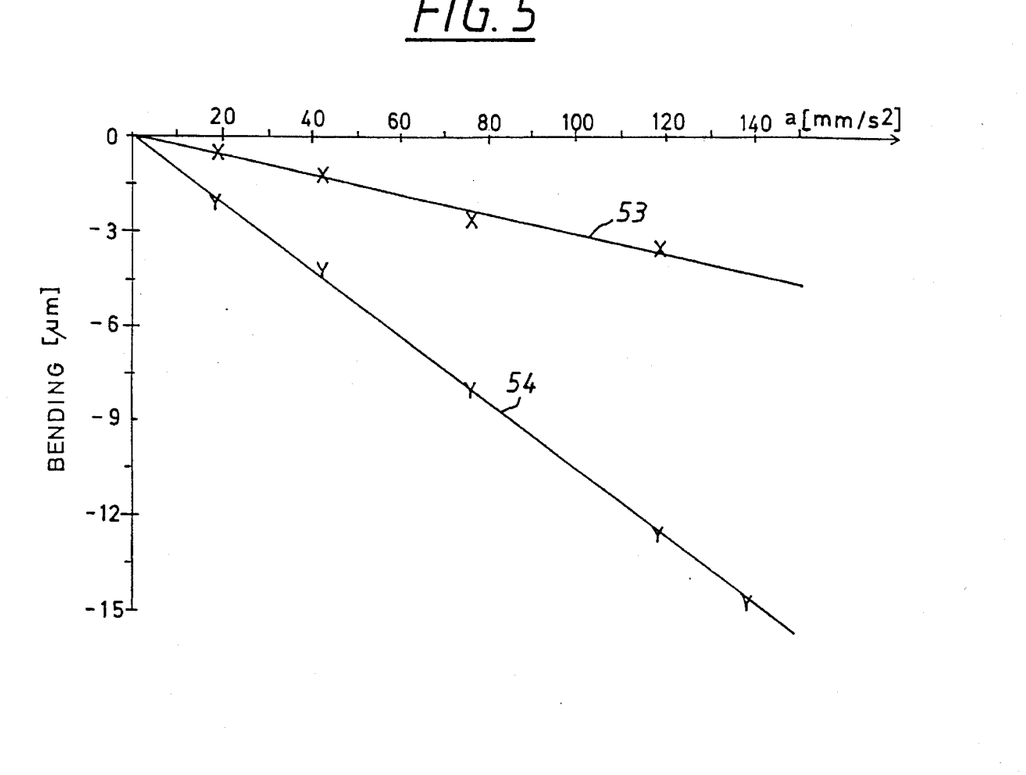
FIGS. 5 is a diagram showing the dynamic bending in the X- and Y-directions of a CMM of the type illustrated in FIG. 1 as a function of the acceleration in the machine axes in question.

For the determination of the elements c22 and c11 of the bending tensor, the change in the probe position as a function of machine acceleration must be measured. For this, a ring gage (39) is scanned with different velocities (and thus with different accelerations of the machine slides (22 and 23)). A sinusoidal acceleration curve is obtained in the involved machine axes x and y. The maximum amplitudes of acceleration components ax and ay are displayed in the high points of the ring gage in the respective axial directions x,y. If only the high points are used for fitting the measured data obtained in this manner to a circle, an apparent diameter change proportional to the machine acceleration is measured, which corresponds to the measurement error due to dynamic machine bending. FIG. 5 shows an example of this measuring error, the "dynamic machine bending" in the two measurement directions x and y as a function of the respective acceleration components ax and ay. The rise of lines (53 and 54) yields the tensor elements c11(z) and c22(x,y) of the bending tensor in the respective measuring site.

Figure 2:
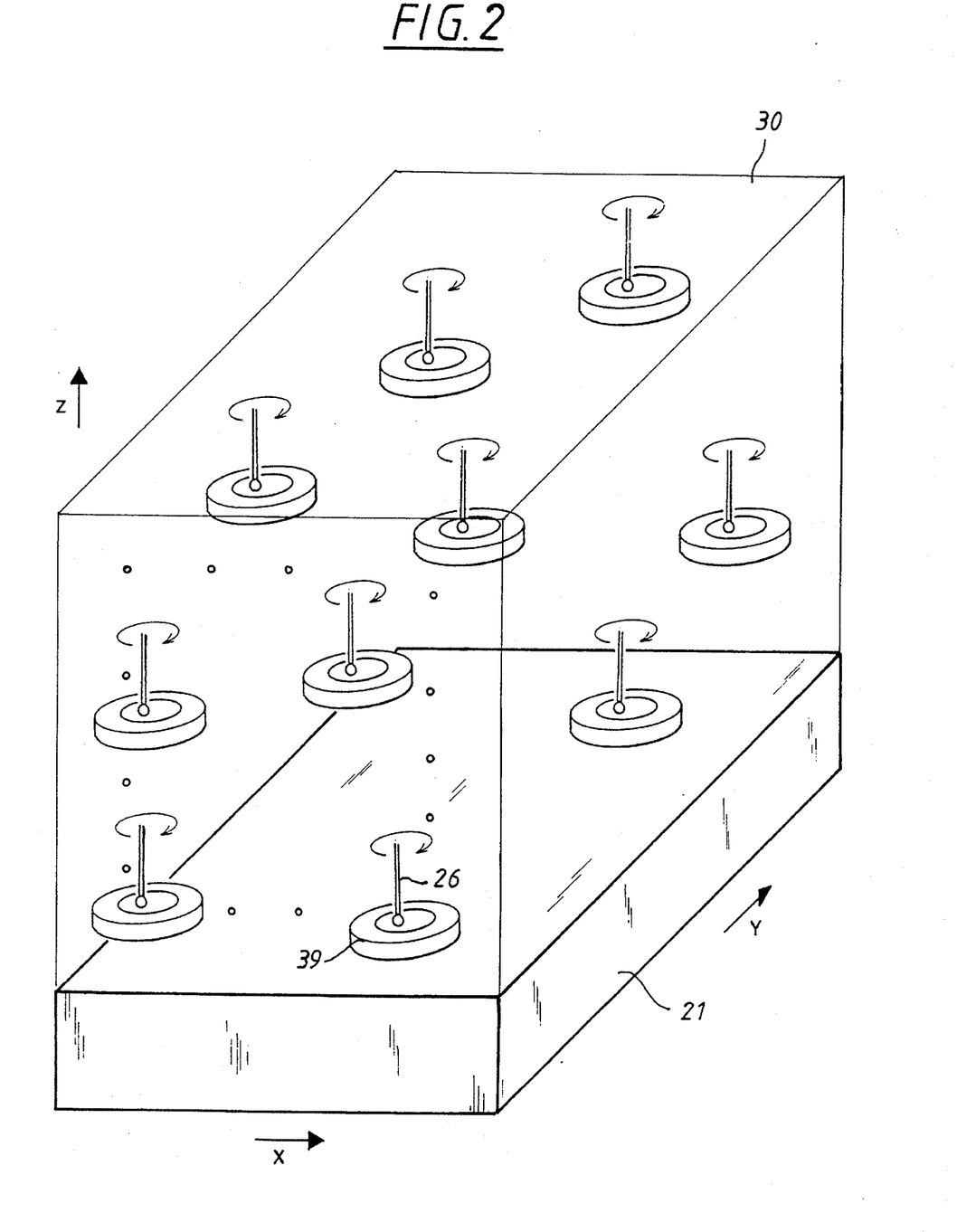
FIG. 2 gives an outline of the measuring volume of the coordinate measurement as per FIG. 1, in which a ring gage serving for the determination of correction parameters is scanned in different positions in the measuring range of the CMM.

As shown in FIG. 2, these measurements are repeated in different positions in the x/z plane of measuring volume (30) of the coordinate measuring machine. The restriction to the x/z plane suffices in this case, because the rigidity of the bridge-type CMM is practically independent of the y-coordinate. The statement described in equations 1 and 2 can, however, also be applied to CMMs of another design and it might then be necessary, as illustrated in FIG. 2, to also determine the dependence on the bending in the direction of the y-axis.

For the subsequent mathematical correction the position-dependent tensor elements c11 and c22 would be stored in the manner of a multi-dimensional data field, with intermediate values being interpolated. But the measured dynamic rigidities can also very well be approximated by second-order functions above the machine positions (Px, Py, Pz). The function coefficients A0, A1 and A2 of the polynomials c11=F(z), c22=F(z)+F(x) are determined by a best fit process and stored for correction in a non-volatile memory of control (27) of the CMM as per FIG. 1. For function c11=F(z), for example, the following equation applies:

$$c11(z)=A0+A1\cdot z+A2\cdot z^2 \qquad (5)$$

Figure 4:
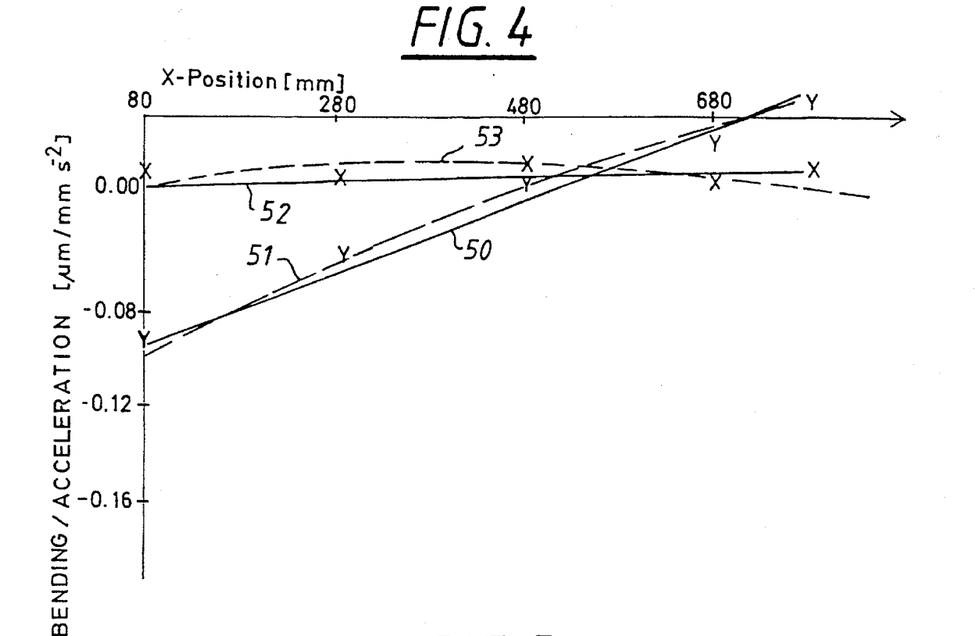
FIG. 4 is a diagram illustrating the rigidity of the coordinate measuring machine as per FIG. 1, as a function of different positions within the measuring volume.

FIG. 4 shows the typical characteristic of the functions c22=F(x) and c11=F(x) for a coordinate measuring machine of the PRISMO type of the applicant. The figure illustrates at the same time the best fit of a linear function (50) and a second-order function (52) and (53) for the functions c22= F(x) and c11 =F(x), respectively.

Figure 3:
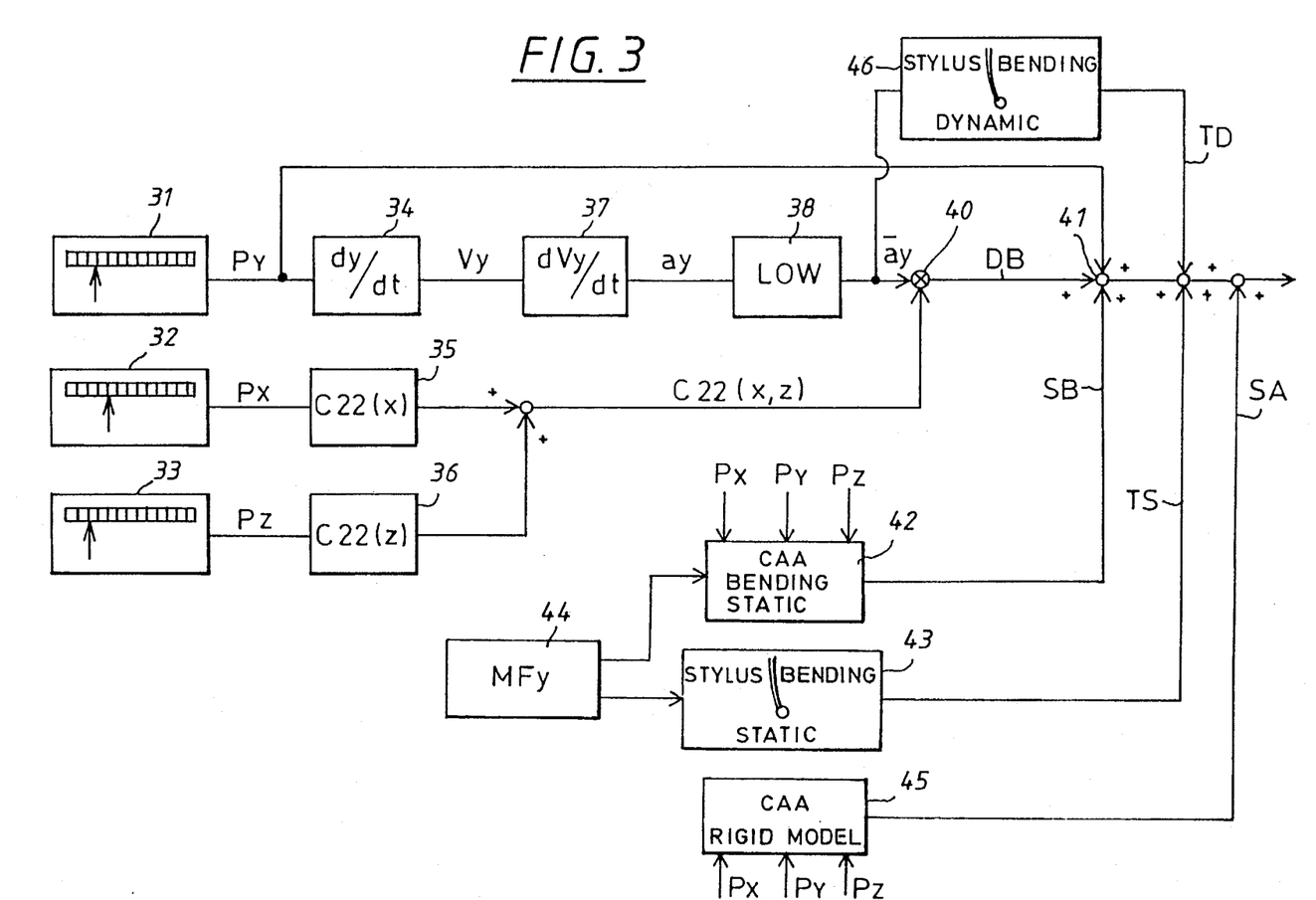
FIG. 3 is a schematic diagram which illustrates the application of different types of correction to the Y—Y value of the CMM as per FIG. 1.

In the subsequent software-correction of the measured data, the current actual position $\vec{P}$ is used to determine the polynomial function values by means of the stored function coefficients A0, A1 and A2, these polynomial functions then being multiplied with the respective acceleration (ax) or (ay). This is illustrated in the function diagram of FIG. 3, using the y-position as an example:

At point (41) of the function diagram, a corrective value (DB) which describes the dynamic bending of the machine is added to the measured position value (Py) supplied by the transducer, this corrective value being obtained as follows: Acceleration (ay) is established by double differentiation of the measured position values (Py) in function blocks (34) and (37), and smoothed in a low-pass filter (38). The smoothed acceleration values (ay) are multiplied with tensor value c22(x,z) which is obtained by using the measured position values (Px) and (Pz) to calculate c22 based on the stored function coefficients A0, A1 and A2.

On top of that, some further corrections are necessary to completely correct the errors of the coordinate measuring machine as per FIG. 1. One of these corrections takes care of the static bending (SB) caused by the measuring force applied by the probe head on the workpiece to be measured as described in German Patent Application P 44 18 550.2, which corresponds to the U.S. patent application filed contemporaneous herewith. The corresponding correction module (42) calls for continuous input of measuring positions (Px,Py,Pz) and of measuring force MF applied by the appropriate measuring force generator (44) in probe head (25). However, it must be said here that the position-dependent bending tensor, which describes the static bending of the coordinate measuring machine as a result of the measuring force applied to the machine via the probe, comprises other values than the bending tensor which describes the dynamic bending of the coordinate measuring machine as a result of the bearing stress caused by reaction forces resulting from the mass distribution in the measuring slides during acceleration.

Furthermore, the guideway errors are corrected by module (45) according to the so-called rigid model as described in the literature quoted in the introductory discussion of the prior art. This module only requires continuous input of the position coordinates, as the influence of forces is not taken into account in this rigid model.

In addition, the static bending of probe (26) mounted on probe head (25) is calculated by means of correction module (43) and added to the correction of the measured position value (Py). The procedure in this correction conforms to the one described in the paper by Lotze mentioned in the introductory part of the specification. The correction also necessitates input of measuring force MF applied by the measuring force generators (44) in probe head (25), but it is position-independent because the tensor describing the probe bending, and thus also the corrective parameters derived therefrom are entirely a function of the probe used and can therefore be established and dealt with separately from the rest of the machine structure.

Finally, the "dynamic bending" of probe (26) mounted on probe head (25) is corrected in a further correction module (46). This state of affairs is illustrated by the diagram in FIG. 7, in which probe head (25) with probe (26) is shown at an enlarged scale as sectional view in a plane including the X-coordinate in the process of scanning a ring gage. In the same way as the forces of mass inertia distort spindle (24) opposite to acceleration direction ax, probe (26) is subjected to mass inertia, but cannot give way as it is in contact with ring gage (39) and therefore bends in the opposite direction, in the same manner as if an additional measuring force had been applied. This additional force, however, is not applied by the measuring force generators in probe head (25) and can therefore not be metrologically recorded. Nor is the force generated at the suspension point of the probe, but depends on the mass distribution in the actual probe. With short, slim probes with low mass, it can be assumed that the mass of the flexibly suspended probe is essentially concentrated in the relatively compact probe mount (26a). In this case, the additional probing bending $\Delta s$ caused by acceleration ax can be calculated in the same manner as the probe bending caused by measuring force application, that is by simply calculating an additional measuring force component Mk' from acceleration ax. Thus, the stored bending tensor to be multiplied remains the same as the one used for the static probe bending correction.

If these requirements are not met, for example, because long, heavy, multi-branched probe configurations are mounted in a mount (26a), separate dynamic bending tensors will have to be determined for this probe and stored for correction. Here, a possible procedure is to calibrate a relatively rigid probe at an arbitrary location within the measuring volume in an initial step by scanning a ring gage or the entire circumference of a calibration sphere at different velocities or accelerations, in order to determine the dynamic bending of the machine structure as described above. The same ring gage, or the same calibration sphere, is then scanned at the same location in the same manner with the exchanged second probe to be calibrated dynamically. From the differences between the measured values, the dynamic stiffness of the exchanged probe as a result of the reaction forces occurring during acceleration is obtained.

Figure 6:
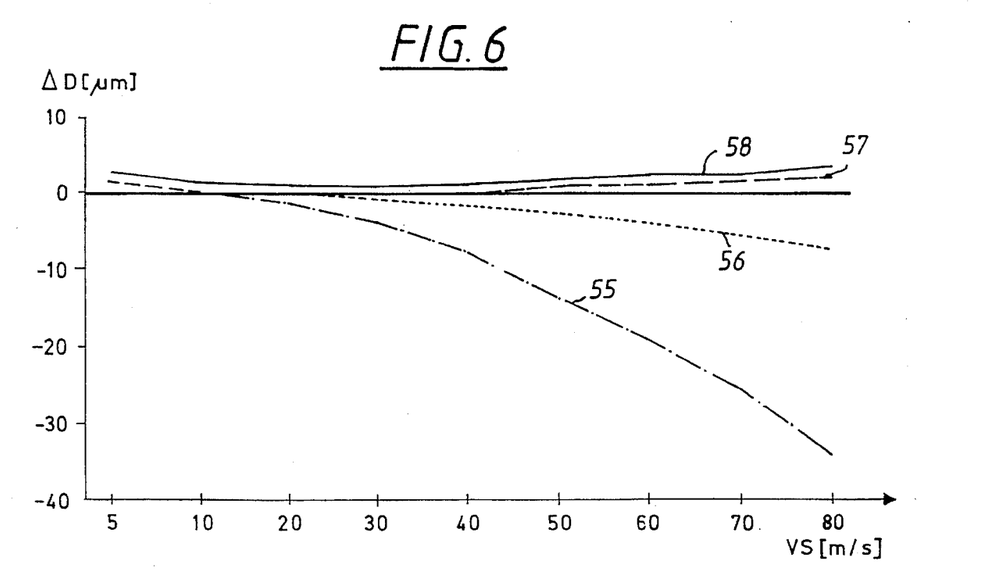
FIG. 6 is a diagram illustrating the effectiveness of the correction method according to the invention when scanning a ring gage at different velocities.
Figure 7:
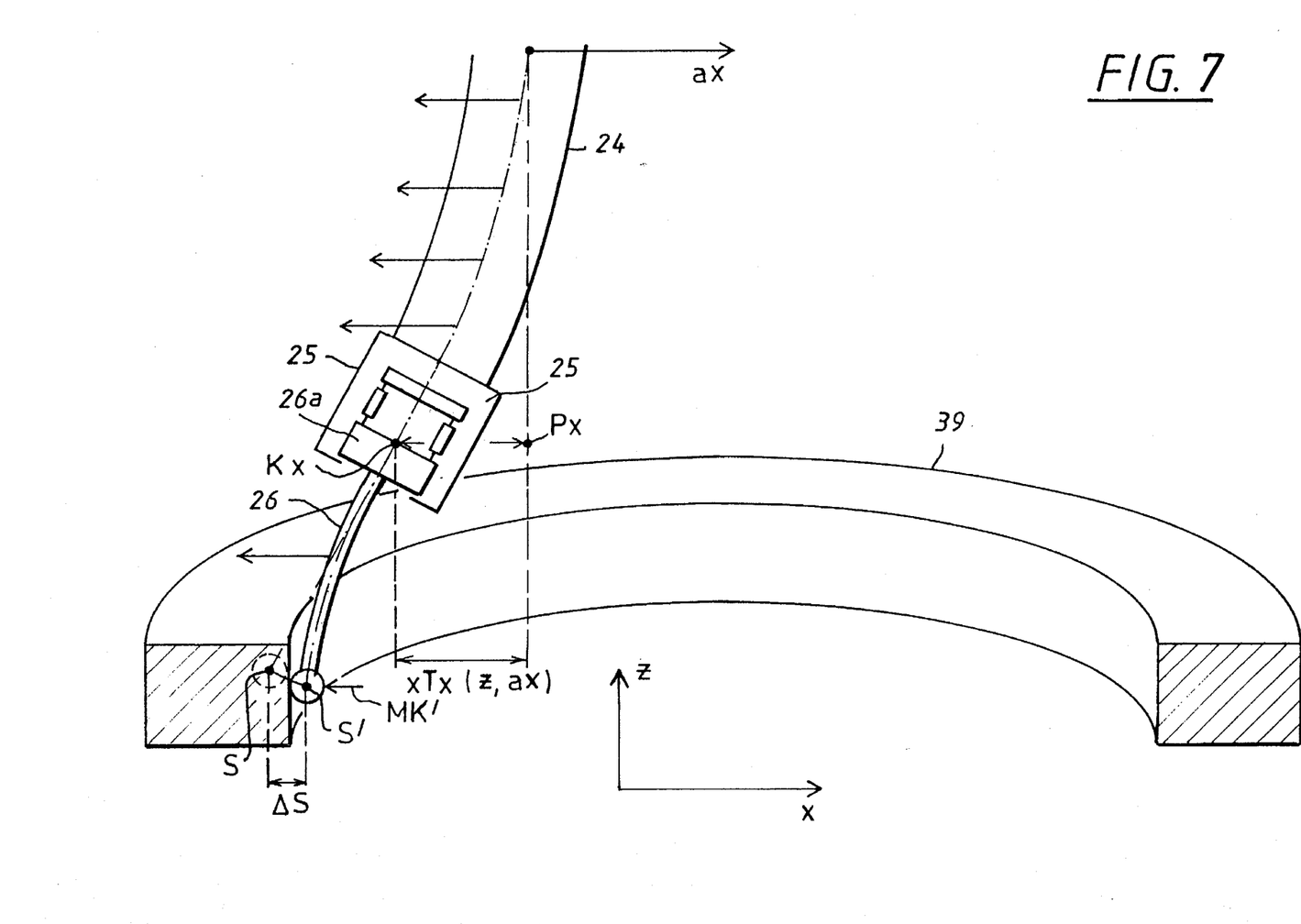
FIG. 7 is a simplified schematic diagram illustrating the influence of dynamic forces of mass inertia on the measuring arm and the probe of the CMM shown in FIG. 1 under the influence of an acceleration acting in the X-direction.
Figure 8A:
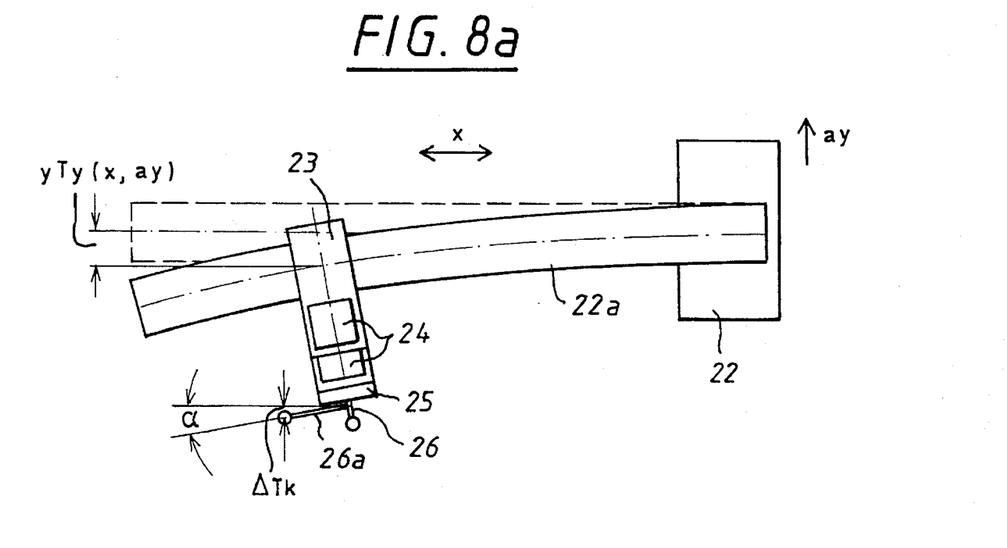
FIGS. 8a and 8b are simplified schematic diagrams illustrating the influence of dynamic forces of mass inertia on the measuring arm and the position of the probe of the CMM shown in FIG. 1 under the influence of an acceleration acting in the Y-direction.
Figure 8B:
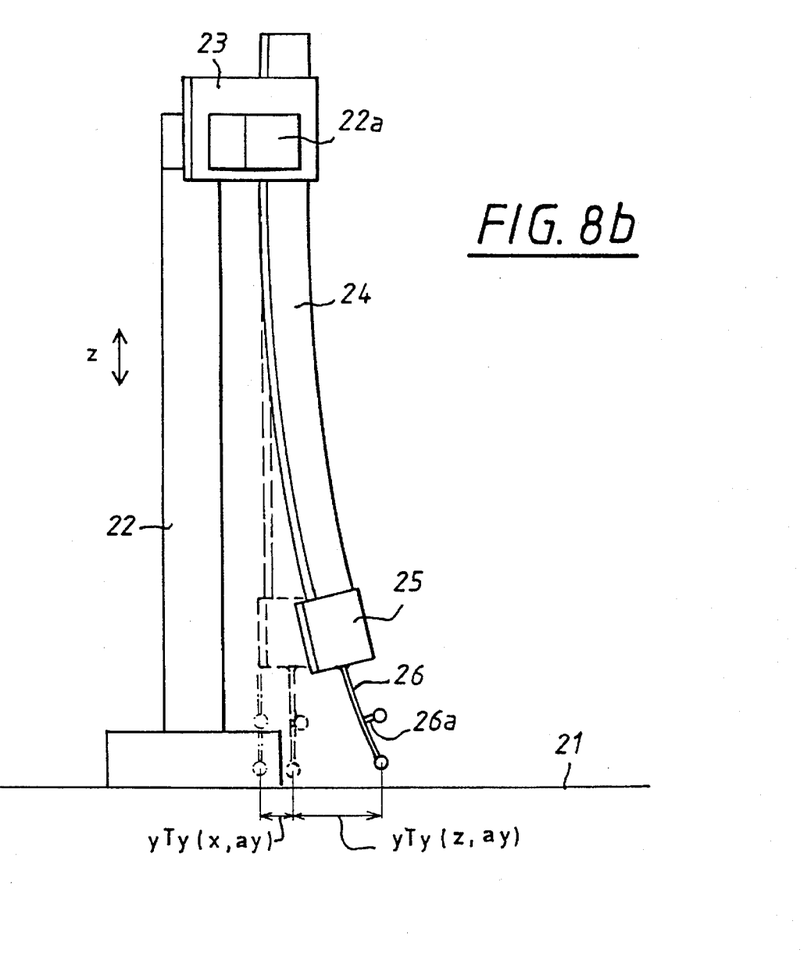

FIG. 6 shows how successfully the afore-mentioned corrective measures are used in a portal-type CMM of the applicant. A ring gage with a diameter of 50 mm was measured on this machine at different scanning velocities between 5 mm/s and 80 mm/s. Apparent was the change of diameter above the scanning velocity as a result of the elastic distortions of the machine structure. The curve labeled (55) is obtained with the bending correction not activated at the measuring location "left below", in other words, directly above the machine table, at the most distant point from column (22). Curve (56) was obtained at the measuring location "right below", in other words above the workpiece table next to column (22). This goes to show that at the first-named measuring location diameter errors of up to about 30 μm are measured when using the high scanning velocity of 80 mm per second.

Curves (57) and (58) were measured at the same measuring locations, but with the correction activated. The relative change in diameter there was below the variation of one micrometer, at the measuring location left below (curve 58) even within only 0.2 micrometer!

In the previously described embodiment, the bending parameters were determined by scanning a ring gage with changing velocities and thus accelerations. It is also possible, of course, to scan the inside or outside contour of another curved calibration specimen instead of the ring gage, for example the equator of a calibration sphere. The bending parameters can also be determined with the help of the measuring systems used to measure the deflection of probe (26) in probe head (25), i.e., with the moving coils normally used for this purpose. In this case, the calibration procedure is performed by probing a suitable workpiece surface in order to scan through the measuring range of the moving coils at different accelerations.

It is always possible, of course, to calculate the stiffness of the machine slides using the data obtained according to the finite element method from the mass distribution in the measuring slides.

Furthermore, separate sensors can be used to determine the acceleration of the measuring slides.

Finally, it is pointed out that the stiffness data need not be individually determined for each and every coordinate measuring machine. Instead, stiffness data can be determined once for a specific machine type, taking into account a manufacturer-related spread, and stored in the form of corrective parameters which are then simply multiplied by the current acceleration of the measuring slides recorded during the measuring process.

We claim:

1. A method for measuring coordinates on workpieces using a coordinate measuring machine having at least one measuring slide, a certain measuring range and a probe head with a probe fixed to said measuring slide, said method comprising the steps of:

establishing parameters characterizing an elastic bending behavior of said coordinate measuring machine for several probe positions within said measuring range by determining components of said parameters, said components being dependent on position of said measuring slide and being at least dependent on acceleration forces acting on said measuring slide;

storing said components as correction values ($c_{11}$, $c_{22}$); and performing correction calculations by taking into account said stored correction values in subsequent coordinate measurements on workpieces.

2. Method according to claim 1, wherein said determining and storing steps comprise compiling and storing said correction values as a multidimensional correction table.

3. Method according to claim 2, further comprising performing said correction calculations by interpolating intermediate values between said correction values stored in said multidimensional correction table.

4. Method according to claim 1, further comprising approximating position dependence of said correction values by mathematical functions ($c_{11}=F(z)$).

5. Method according to claim 4, in which said mathematical functions are polynomials whose coefficients (A0, A1, A2) are stored for mathematical correction of measured position data.

6. Method according to claim 2, in which said stored tables are a function of measuring slide acceleration ($\vec{a}$), and said measuring slide acceleration ($\vec{a}$) is measured and measured acceleration is included in said correction calculations.

7. Method according to claim 4, in which said mathematical functions are a function of measuring slide acceleration, and said measuring slide acceleration ($\vec{a}$) is measured and measured acceleration is included in said correction calculation.

8. Method according to claim 1, further comprising determining said correction values in advance by scanning a test specimen (39) in succession in different positions within said measuring range (30) of said coordinate measuring machine and scanning said test specimen at different velocities.

9. Method according to claim 1, further comprising determining static guideway deviations of measuring slides (22, 23, 24) of said coordinate measuring machine from a straight-line, orthogonal coordinate system, calculating and storing further correction values based on said static guideway deviations, and combining said further correction values with measured position data in subsequent measurement of workpieces.

10. Method according to claim 9, further comprising the following steps, not necessarily in stated order:

determining elastic bendings of said coordinate measuring machine in a first calibration as a function of forces applied to said coordinate measuring machine, and determining and storing a first set of correction values (DB), said first set of correction values being a function of coordinate measuring machine probe position within said measuring range of said coordinate measuring machine and measuring slide acceleration ($\vec{a}$), determining static guideway deviations of measuring slides in a second calibration, and storing from said static guideway deviations a second set of correction values that is independent of acceleration, said second set of correction values being a function of said probe position within said measuring range of said coordinate measuring machine, and combining both sets of correction values with position data (Px,Py,Pz) measured with said coordinate measuring machine in subsequent coordinate measurement on workpieces.

11. Method according to claim 10, wherein acceleration ($\vec{a}$) is applied to said coordinate measuring machine measuring slides by coordinate measuring machine drives.

12. Method according to claim 1, further comprising measuring elastic bending behavior of said coordinate measuring machine as a result of measuring force (MF) between a probe (26) of said coordinate measuring machine and a workpiece (29, 39) from which a third set of correction values (TB) is determined and used for performing a correction calculation.

13. Method according to claim 1, further comprising determining measuring slide acceleration (ax, ay, az) by differentiating measured position data of measuring systems (31, 32, 33) assigned to said measuring slide twice according to time.

14. Method according to claim 1, further comprising measuring measuring slide acceleration (ax, ay, az) by means of acceleration detectors.

15. Method according to claim 1, further comprising determining bending behavior of a probe mounted flexibly in a probe head of said coordinate measuring machine as a function of mass reaction forces that occur as a result of acceleration of said probe head and that deform said probe, with said bending behavior being taken into account in correction of measured coordinate data.

16. Method according to claim 1, wherein acceleration ($\vec{a}$) is applied to said coordinate measuring machine measuring slide by coordinate measuring machine drives.

17. Method according to claim 1, wherein said acceleration is applied to said measuring slide by operator controlled means in a manually operated coordinate measuring machine.

* * * * *